United States Patent
Hwang

(10) Patent No.: US 9,047,909 B2
(45) Date of Patent: Jun. 2, 2015

(54) SKEW ADJUSTING APPARATUS AND OPTICAL DISC DRIVE INCLUDING THE SAME

(75) Inventor: Bo-won Hwang, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/544,183

(22) Filed: Jul. 9, 2012

(65) Prior Publication Data

US 2013/0036432 A1 Feb. 7, 2013

(30) Foreign Application Priority Data

Aug. 4, 2011 (KR) .................. 10-2011-0077849

(51) Int. Cl.
*G11B 19/20* (2006.01)
*G11B 17/028* (2006.01)
*G11B 17/056* (2006.01)

(52) U.S. Cl.
CPC ........ *G11B 19/2009* (2013.01); *G11B 17/0282* (2013.01); *G11B 17/056* (2013.01)

(58) Field of Classification Search
CPC .... G11B 17/02; G11B 17/022; G11B 17/028; G11B 17/0282; G11B 17/056; G11B 17/0565; G11B 19/20; G11B 19/2009; G11B 33/12; G11B 33/121; G11B 33/123; G11B 33/124
USPC .................................. 720/689–698
See application file for complete search history.

(56) References Cited

U.S. PATENT DOCUMENTS

| 7,243,359 | B2 | 7/2007 | Saito et al. | |
|---|---|---|---|---|
| 2003/0026193 | A1* | 2/2003 | Shiomi et al. | 369/270 |
| 2004/0205794 | A1* | 10/2004 | Chang | 720/675 |
| 2007/0089121 | A1* | 4/2007 | Wang | 720/697 |
| 2007/0240177 | A1* | 10/2007 | Matsui | 720/697 |
| 2011/0065291 | A1* | 3/2011 | Wei | 439/62 |

FOREIGN PATENT DOCUMENTS

| JP | 2005-276243 A | | 10/2005 |
|---|---|---|---|
| JP | 2008-59721 A | | 3/2008 |
| KR | 20030076895 A | * | 9/2003 |
| KR | 10-0652193 B1 | | 11/2006 |
| KR | 10-2008-0107649 | | 12/2008 |
| KR | 10-2009-0016284 | | 2/2009 |
| KR | 10-2009-0076073 | | 7/2009 |

OTHER PUBLICATIONS

English translation of KR20030076895A.*
Korean Office Action issued Nov. 23, 2012 in counterpart Korean Patent Application No. 10-2011-0077849 (5 pages, in Korean).

* cited by examiner

*Primary Examiner* — Nathan Danielsen
(74) *Attorney, Agent, or Firm* — NSIP Law

(57) ABSTRACT

A skew adjusting apparatus is provided. The skew adjusting apparatus includes a plurality of skew support members provided on a base mold coupled to a base chassis to have an elastic force, and a plurality of skew screws configured to couple a motor plate that supports a spindle motor to the base mold.

9 Claims, 5 Drawing Sheets

SKEW ADJUSTING APPARATUS AND OPTICAL DISC DRIVE INCLUDING THE SAME

CROSS-REFERENCE TO RELATED PATENT APPLICATION

This application claims the benefit of Korean Patent Application No. 10-2011-0077849, filed on Aug. 4, 2011, in the Korean Intellectual Property Office, the entire disclosure of which is incorporated herein by reference for all purposes.

BACKGROUND

1. Field

The following description relates to a skew adjusting apparatus and an optical disc drive including the same.

2. Description of the Related Art

Optical disc drives are devices configured to emit light to an optical disc and write or read information to or from the optical disc. The optical disc may be a compact disc (CD) or a digital video disc (DVD).

An optical disc reflects a laser beam emitted from an optical pickup that moves in a radial direction of the optical disc. The optical pickup reads data based on a change in a polarization, a phase or a reflectance of the laser beam. The optical disc is clamped onto a turntable that is rotated by a spindle motor.

In order for an optical disc drive including an optical disc to write a signal onto a signal recording surface of the optical disc and read a recorded signal, light emitted from an optical pickup is preferred to be perpendicularly incident on the signal recording surface of the optical disc.

However, since an optical path of the optical pickup or a spindle motor unit on which the optical disc is mounted may be inclined, an optical axis of the optical pickup and the signal recording surface of the optical disc are not perpendicular to each other. In other words, the optical axis of the optical pickup and the signal recording surface may have an angle or a skew therebetween. Such a skew leads to optical aberration. Optical aberration is a phenomenon in that a direction in which light is incident looks different to an observer who moves in a direction perpendicular to the direction in which the light is incident. The phenomenon causes a degradation in the reliability of a read signal. Accordingly, positions of the signal recording surface of the optical disc and the optical pickup are adjusted. The positions that are adjusted are called skew adjustment.

There are two conventional methods of adjusting skew:

One conventional method involves rotating screws provided on both ends of two guide shafts that guide the optical pickup in a radial direction of the optical disc to adjust positions of an optical pickup and an optical disc. The screws are rotated to dispose the optical pickup and the optical disc perpendicular to each other.

The other conventional method uses a spindle motor. In other words, a plurality of coupling screws is coupled to a main base by passing the plurality of coupling bosses through a plurality of coupling bosses formed on a base mold by which the spindle motor is supported to mount the spindle motor on the main base. In this case, a plurality of springs whose both ends are respectively supported by the spindle motor and the base mold are provided around the coupling bosses to adjust the degree of the coupling screws coupled to the main base. Accordingly, an adjustment of the degree of the coupling screws coupled to the main base adjusts a height of the spindle motor to adjust a skew.

However, since the plurality of springs is provided, an assembling process is complex. Due to the complexity of the assembly process, the ability to assemble and productivity are relatively low and production costs are relatively high.

SUMMARY

According to an aspect, a skew adjusting apparatus is provided. The skew adjusting apparatus includes a plurality of skew support members provided on a base mold coupled to a base chassis to have an elastic force, and a plurality of skew screws configured to couple a motor plate that supports a spindle motor to the base mold.

The plurality of skew support members may be elastic members, and may be coupled to the plurality of skew screws, and the plurality of skew screws may be respectively inserted into the plurality of skew support members.

Each of the plurality of skew support members may include at least one cut portion configured to be easily elastically deformed.

The plurality of skew support members may be integrally formed with the base mold.

In response to the plurality of skew screws being coupled to the plurality of skew support members, the skew support members may contact the motor plate.

The plurality of skew support members may be formed on both sides of the base mold to contact both ends of the motor plate and support the motor plate.

The skew adjusting apparatus may further include a plurality of skew bosses into which the plurality of skew screws configured to couple the motor plate to the base mold is respectively inserted.

In response to the plurality of skew screws being coupled to the plurality of skew bosses, the plurality of skew bosses may be spaced apart from the motor plate by a predetermined interval and the plurality of skew support members contacts both ends of the motor plate.

Each on the skew support members may be formed of plastic.

In another aspect, an optical disc drive is provided. The optical disc drive includes a main frame, a tray on which an optical disc is mounted and configured to move into or out of the main frame, a base chassis configured to be elevatably provided on the main frame such that an optical pickup linearly reciprocates, and a skew adjusting apparatus configured to adjust a skew of the optical pickup, the skew adjusting apparatus including a plurality of skew support members that are provided on a base mold coupled to the base chassis to have an elastic force, and a plurality of skew screws configured to couple a motor plate that supports a spindle motor to the base mold.

The plurality of skew support members may be elastic members, and may be coupled to the plurality of skew screws, and the plurality of skew screws may be respectively inserted into the plurality of skew support members.

Each of the plurality of skew support members may include at least one cut portion to be easily elastically deformed.

The plurality of skew support members may be integrally formed with the base mold.

In response to the plurality of skew screws being coupled to the plurality of skew support members, the plurality of skew support members may contact the motor plate.

The plurality of skew support members may be formed on both sides of the base mold to contact both ends of the motor plate and support the motor plate.

The optical disc drive may further include a plurality of skew bosses into which the plurality of skew screws that couple the motor plate to the base mold is respectively inserted.

In response to the plurality of skew screws being coupled to the plurality of skew bosses, the plurality of skew bosses may be spaced apart from the motor plate by a predetermined interval and the plurality of skew support members may contact both ends of the motor plate.

The optical disc drive may further include a plurality of stoppers formed to protrude from the base mold to define a position of the motor plate coupled to the base mold.

The skew support members may be formed in a polygonal shape.

In another aspect, an optical disc drive is provided. The optical disc drive includes a main frame, a tray on which an optical disc is mounted and configured to move in or out of the main frame, a base chassis configured to be elevatably provided on the main frame such that an optical pickup linearly reciprocates, and a skew adjusting apparatus configured to adjust a skew of the optical pickup, the skew adjusting apparatus including a plurality of skew bosses each of which has an elastic force and into which a plurality of skew screws configured to couple a motor plate to a base mold is respectively inserted, a plurality of skew support members each of which has an elastic force and is configured to support the base mold coupled to the base chassis, and the plurality of skew screws configured to couple the motor plate to the base mold.

In response to the motor plate being coupled to the base mold, the skew bosses may contact the motor plate.

Other features and aspects may be apparent from the following detailed description, the drawings, and the claims.

Figure 1:
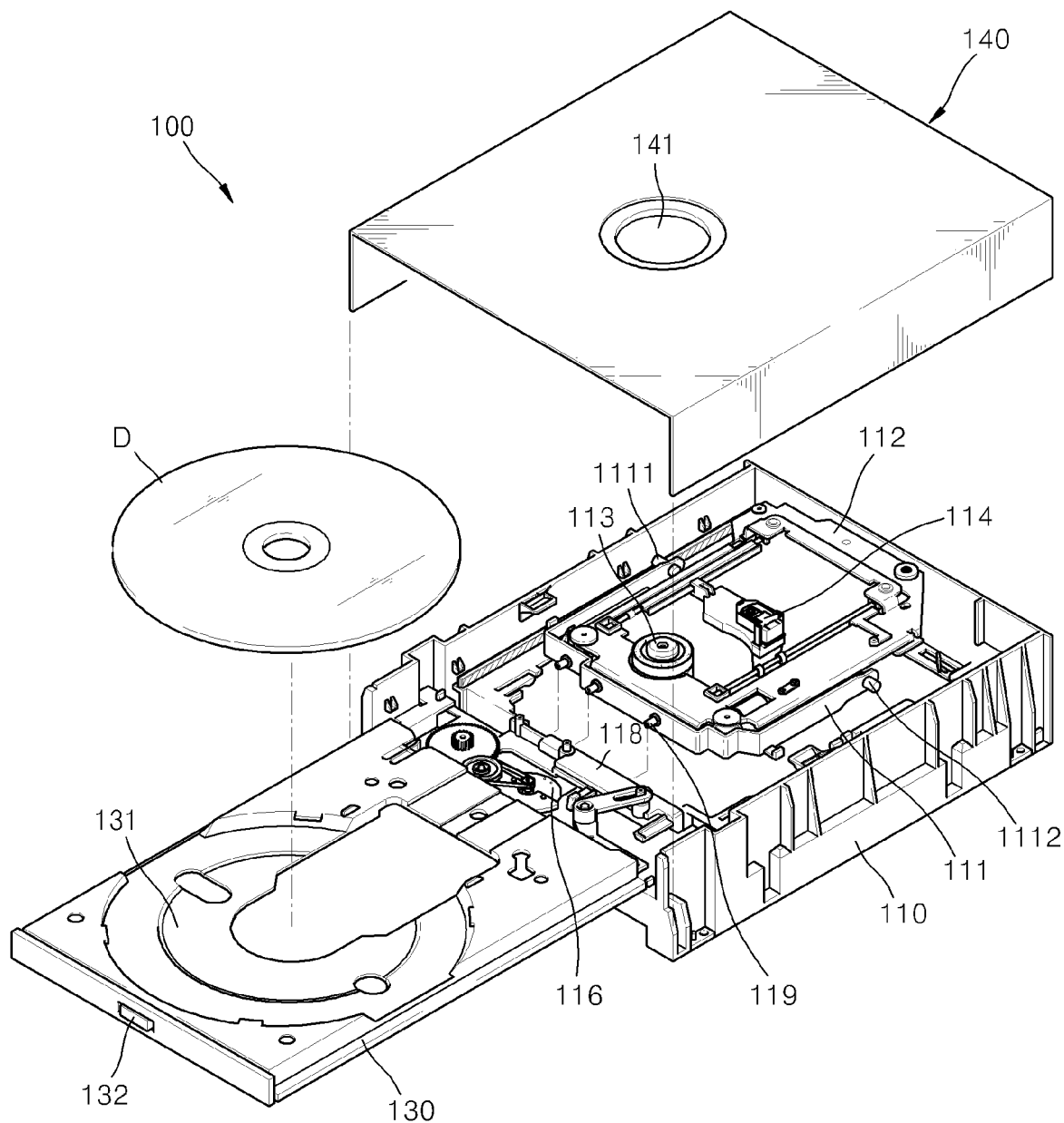
FIG. 1 is an exploded perspective view illustrating an example of an optical disc drive including a skew adjusting apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
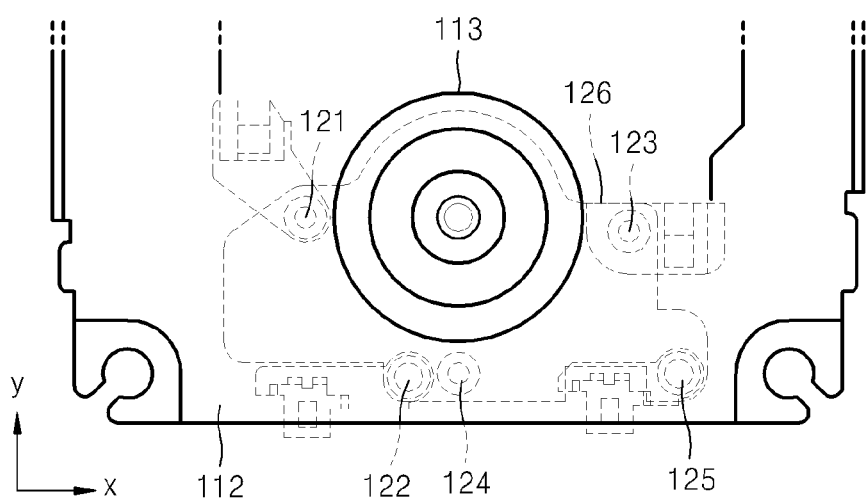
FIG. 2 is a plan view illustrating the example of the skew adjusting apparatus of FIG. 1.
Figure 3:
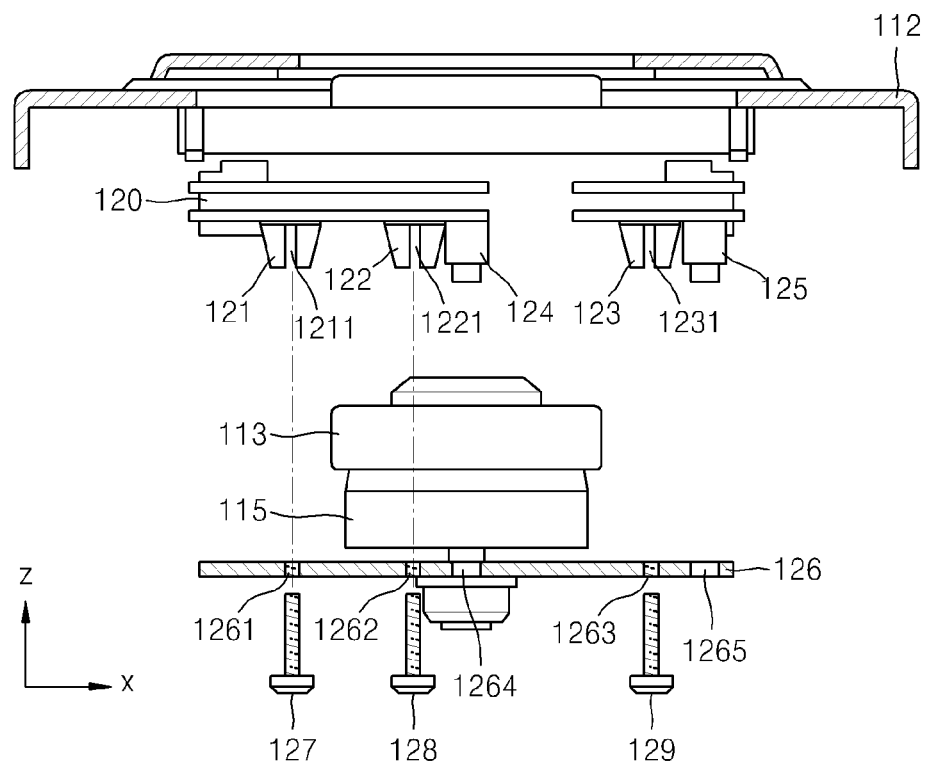
FIG. 3 is a cross-sectional view illustrating the example of the skew adjusting apparatus which is disassembled.
Figure 4:
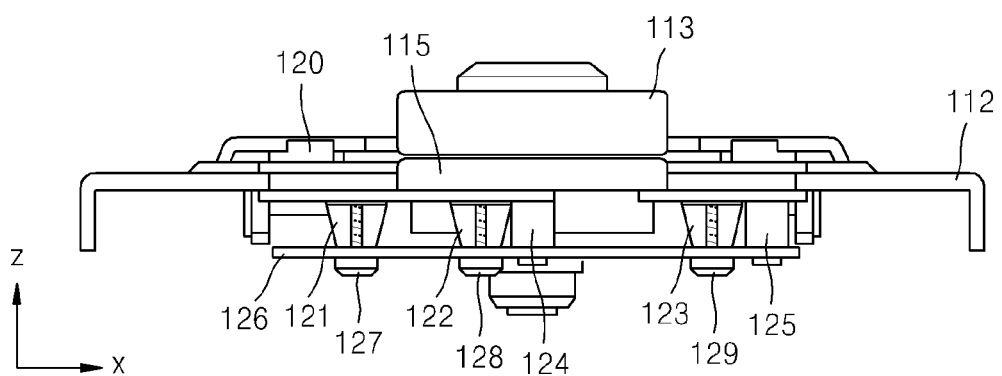
FIG. 4 is a side view illustrating the example of the skew adjusting apparatus of FIG. 3 which is assembled.

FIG. 1 illustrates an example of an optical disc drive 100 including a skew adjusting apparatus. FIG. 2 illustrates the example of the skew adjusting apparatus of FIG. 1. FIG. 3 illustrates the example of the skew adjusting apparatus which is disassembled. FIG. 4 illustrates the example of the skew adjusting apparatus of FIG. 3 which is assembled.

Referring to FIG. 1, the optical disc drive 100 includes a main frame 110, a tray 130 configured to slide in or out of the main frame 110, a sub-frame 111 that is pivotably provided on the main frame 110, and a base chassis 112 that is supported by the sub-frame 111. The main frame 110 includes a mount portion 131 on which an optical disc D may be mounted.

A sliding member 118 is provided on the main frame 110. The sliding member 118 slides in a direction perpendicular to a direction in which the tray 130 moves in or out of the main frame 110 due to a driving motor 116. A plurality of cam holes (not shown) is formed in the sliding member 118. Since cam projections 119 formed on the sub-frame 111 slide along the cam holes, the sub-frame 111 vertically pivots about pivot shafts 1111 and 1112. The main frame 110 supports the pivot shafts 1111 and 1112. A turntable 113, a spindle motor 115 (see FIG. 3), and an optical pickup unit 114 are provided on the base chassis 112. The turntable 113 is configured to mount the optical disc D that is mounted on the tray 130 and to be carried into the main frame 110. The spindle motor 115 is configured to have the same axis as the turntable 113 and rotate the turntable 113. The optical pickup unit 114 is configured to write or read information to or from the optical disc D mounted on the turntable 113 by sliding in a radial direction of the optical disc D. A switch 132 configured to output a signal for loading or unloading the tray 130 on or from the main frame 110 may be provided on a front surface of the tray 130.

A top surface of the main frame 110 is covered by a cover 140. A clamper 141 configured to clamp the optical disc D mounted on the turntable 113 is provided on the cover 140.

Referring to FIGS. 2 through 4, the skew adjusting apparatus includes three skew support members 121, 122, and 123 protruding from a base mold 120, and three skew screws 127, 128, and 129, respectively, coupled to the skew support members 121, 122, and 123 to couple a motor plate 126 to the base mold 120. The spindle motor 115 is provided on the motor plate 126.

The base mold 120 is configured to be inserted into the base chassis 112. The skew support members 121, 122, and 123 protruding by a predetermined length on one side of the base mold 120 facing the motor plate 126 are configured to be spaced apart from one another by a predetermined interval. The skew support members 121, 122, and 123 are configured to form a triangular shape around the turntable 113, as shown in FIG. 2. In another example, the skew support members 121, 122, and 123 may be integrally formed with the base mold 120. In general, each of the base mold 120 and the skew support members 121, 122, and 123 may be formed of a plastic material. In another example, each of the base mold 120 and the skew support members 121, 122, and 123 may be formed of a material other than plastic. At least one cut portion may be formed in a skew support member in order for each of the skew support members 121, 122, and 123 to have an elastic force. For example, cut portions 1211, 1221, and 1231 may be formed in the skew support members 121, 122, and 123, respectively. Accordingly, in response to an external force being applied to the skew support members 121, 122, and 123, the skew support members 121, 122, and 123 may be elastically deformed due to characteristics of materials of the skew support members 121, 122, and 123 and functions of the cut portions 1211, 1221, and 1231.

In addition, two stoppers 124 and 125 are provided on the base mold 120. The stoppers 124 and 125 are configured to define a position of the motor plate 126 coupled to the base mold 120 protruding from the base mold 120 by a predetermined length. A length of each of the stoppers 124 and 125 protruding from the base mold 120 may be greater than a length of each of the skew support members 121, 122, and 123 protruding from the base mold 120.

The motor plate 126 rotatably supports the spindle motor 115, and includes three through-holes 1261, 1262, and 1263 and two insertion holes 1264 and 1265. The skew screws 127, 128, and 129 pass through the three through-holes 1261, 1262, and 1263, and the stoppers 124 and 125 are inserted into the two insertion holes 1264 and 1265.

In response to the stoppers 124 and 125 being respectively inserted into the insertion holes 1264 and 1265 of the motor plate 126 and the skew screws 127, 128, and 129 being respectively coupled to the skew support members 121, 122, and 123, the motor plate 126 may be coupled to the base mold 120. In this case, the skew support members 121, 122, and 123 are in contact with the motor plate 126.

Shapes, positions, and the number of the skew support members 121, 122, and 123 are not limited to those of FIGS. 2 and 3, and various modifications may be made as long as each of the skew support members 121, 122, and 123 has an elastic force.

Figure 7:
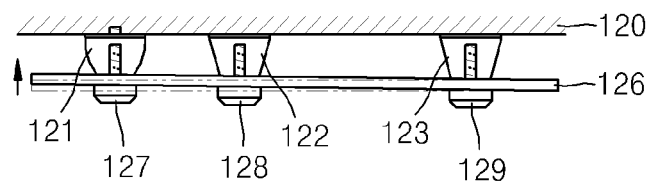
FIG. 7 is a cross-sectional view illustrating an example of a method of adjusting a skew using a skew adjusting apparatus.

A method of adjusting a skew using a skew adjusting apparatus will be explained. FIG. 7 illustrates an example of a method of adjusting a skew using the skew adjusting apparatus.

Referring to FIG. 7, in a state where the skew screw 127 is coupled to the skew support member 121, in response to the skew screw 127 being further rotated, the skew support member 121 is elastically deformed. In this case, the motor plate 126 moves further toward the base mold 120, the motor plate 126 is inclined, and accordingly, the spindle motor 115 (see FIG. 3) is inclined at a predetermined angle. On the other hand, in response to the skew screw 127 being rotated in an opposite direction, an event opposite to that described above events occur. A skew may be adjusted by appropriately performing such an operation using the three skew screws 126, 127, and 128.

Figure 5:
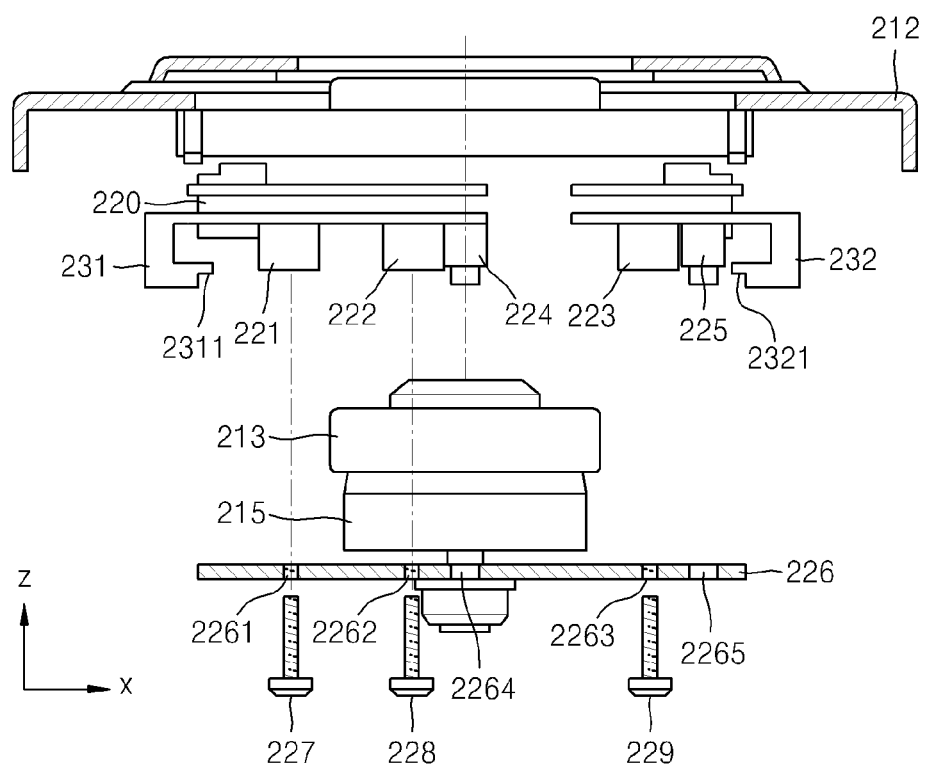
FIG. 5 is a cross-sectional view illustrating another example of a skew adjusting apparatus which is disassembled.
Figure 6:
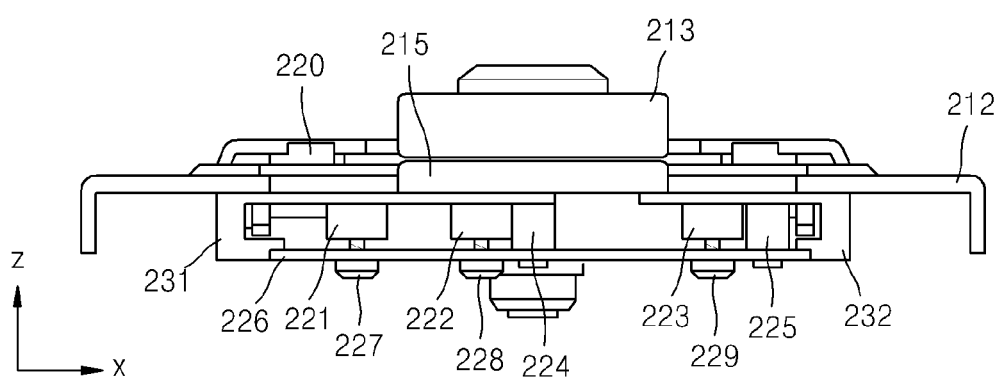
FIG. 6 is a side view illustrating the skew adjusting apparatus of FIG. 5 which is assembled.

FIG. 5 illustrates another example of a skew adjusting apparatus which is disassembled. FIG. 6 illustrates the skew adjusting apparatus of FIG. 5 which is assembled.

Referring to FIGS. 5 and 6, the skew adjusting apparatus includes two skew support members 231 and 232, and three skew screws 227, 228, and 229. The two skew support members 231 and 232 are configured to protrude from both sides of a base mold 220. The three skew screws 227, 228, and 229 are respectively coupled to three skew bosses 221, 222, and 223 to couple the base mold 220 to a motor plate 226. A spindle motor 215 is mounted on the motor plate 226.

The base mold 220 is formed to be inserted into a base chassis 212. The skew bosses 221, 222, and 223 protrude by a predetermined length from a side of the base mold 220 facing the motor plate 226. The skew bosses 221, 222, and 223 are to be spaced apart from one another by a predetermined interval. The skew support members 231 and 232 extend from both sides of the base mold 220 by a predetermined length, and support members 2311 and 2321 to which the motor plate 226 are coupled to are provided on the skew support members 231 and 232, respectively.

The skew support members 231 and 232 may be integrally formed with the base mold 220 and each of the skew support members 231 and 232 may have an elastic force. Due to the skew support members 231 and 232, the skew support members 231 and 232 may be elastically deformed in response to an external force being applied to the skew support members 231 and 232. The skew bosses 221, 222, and 223 may also be integrally formed with the base mold 220.

In addition, two stoppers 224 and 225 are provided on the base mold 220. The stoppers 224 and 225 protrude from the base mold 220 by a predetermined length to define a position of the motor plate 226 coupled to the base mold 220. A length of each of the stoppers 224 and 225 protruding form the base mold 220 may be greater than a length of each of the skew bosses 221, 222, and 223 protruding from the base mold 220.

The motor plate 226 rotatably supports the spindle motor 215, and includes three through-holes 2261, 2262, and 2263 and two insertion holes 2264 and 2265. The skew screws 227, 228, and 229 may pass through the three through-holes 2261, 2262, and 2263. The stoppers 224 and 225 may be inserted into the two insertion holes 2264 and 2265. In response to the stoppers 224 and 225 being inserted into the insertion holes 2264 and 2265 of the motor plate 226 and the skew screws 227, 228, and 229 being respectively coupled to the skew bosses 221, 222, and 223, the motor plate 226 may be coupled to the base mold 220. In this case, two sides of the motor plate 226 are respectively coupled to and the two sides of the motor plate 226 may contact the support members 2311 and 2321 of the skew support members 231 and 232. The skew bosses 221, 222, and 223 may be spaced apart from the motor plate 226 without contacting the motor plate 226.

Shapes, positions, and the number of the skew support members 231 and 232 are not limited to those in FIGS. 5 and 6, and various modifications may be made as long as each of the skew support members 231 and 232 has an elastic force.

A method of adjusting a skew using the other example of the skew adjusting apparatus of FIG. 5 will be explained.

In a state where the skew screws 227, 228, and 229 are coupled to the skew bosses 221, 222, and 223, respectively, in response to the skew screws 227, 228, and 229 being tightened or loosened, the motor plate 226 supported by the skew support members 231 and 232 is inclined at a predetermined angle with respect to the base mold 220. A skew may be adjusted by adjusting an angle at which the spindle motor 215 is inclined as the motor plate 226 is inclined. A skew may be adjusted using the skew screws 227, 228, and 229.

Although not shown, according to other examples, each of a plurality of skew bosses may have an elastic force and skew support members may be formed on both ends of a base mold to support a motor plate. In this configuration, the skew bosses to which the skew screws are coupled to contact the motor plate, and the skew support members support the motor plate. Accordingly, in response to the skew screws being tightened or loosened, the skew bosses and the skew support members may be elastically deformed, thereby making it possible to adjust an angle at which the motor plate is inclined.

As such, according to a skew adjusting apparatus and an optical disc drive including the same of the present application, since skew support members to which skew screws are coupled to may be elastically deformed, additional springs may not be required, thereby improving ability to assemble and reducing production costs.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A skew adjusting apparatus comprising:
a motor plate and a spindle motor disposed on the motor plate;
a base mold disposed above the motor plate and comprising an opening for receiving the spindle motor, the base mold further comprising a plurality of elastic skew support members protruding from the base mold toward the motor plate;
a plurality of skew screws configured to be inserted through the motor plate and into the elastic skew support members of the base mold to couple the motor plate that supports the spindle motor to the base mold; and
stoppers protruding from the base mold and configured to be inserted into the motor plate to define a position of the motor plate coupled to the base mold, wherein
each of the plurality of elastic skew support members comprises a out portion that extends from the motor plate to the base mold and is to be elastically determined.

2. The skew adjusting apparatus of claim 1, wherein the plurality of elastic skew support members are coupled to the plurality of skew screws, and
wherein the plurality of skew screws are respectively inserted into the plurality of skew support members.

3. The skew adjusting apparatus of claim 1, wherein the plurality of skew elastic support members are integrally formed with the base mold.

4. The skew adjusting apparatus of claim 1, wherein the spindle motor is elastically inclined at an angle with respect to the base mold based on the plurality of skew screws being coupled to the plurality of elastic skew support members.

5. The skew adjusting apparatus of claim 1, wherein a length by which the stoppers protrude from the base mold is greater than a length by which the plurality of skew support members protrudes from the base mold.

6. An optical disc drive comprising:
a main frame;
a tray on which an optical disc is mounted and configured to move into and out of the main frame;
a base chassis provided on the main frame such that an optical pickup linearly reciprocates; and
a skew adjusting apparatus configured to adjust a skew of the optical pickup, the skew adjusting apparatus comprising:
a motor plate and a spindle motor disposed on the motor plate;
a base mold disposed above the motor plate and comprising an opening for receiving the spindle motor, the base mold further comprising a plurality of elastic skew support members protruding from the base mold toward the motor plate;
a plurality of skew screws configured to be inserted through the motor plate and into the elastic skew support members of the base mold to couple the motor plate that supports the spindle motor to the base mold; and
stoppers protruding from the base mold and configured to be inserted into the motor plate to define a position of the motor plate coupled to the base mold, wherein
each of the plurality of elastic skew support members comprises a out portion that extends from the motor plate to the base mold and is to be elastically determined.

7. The optical disc drive of claim 6, wherein the plurality of elastic skew support members are coupled to the plurality of skew screws, and wherein the plurality of skew screws are respectively inserted into the plurality of elastic skew support members.

8. The optical disc drive of claim 6, wherein the plurality of elastic skew support members are integrally formed with the base mold.

9. The optical disc drive of claim 6, wherein a length by which the stoppers protrude from the base mold is greater than a length by which the plurality of skew support members protrudes from the base mold.

* * * * *